May 11, 1926.
J. SOUKUP
ANTISKID SHOE
Filed June 21, 1921
1,584,676
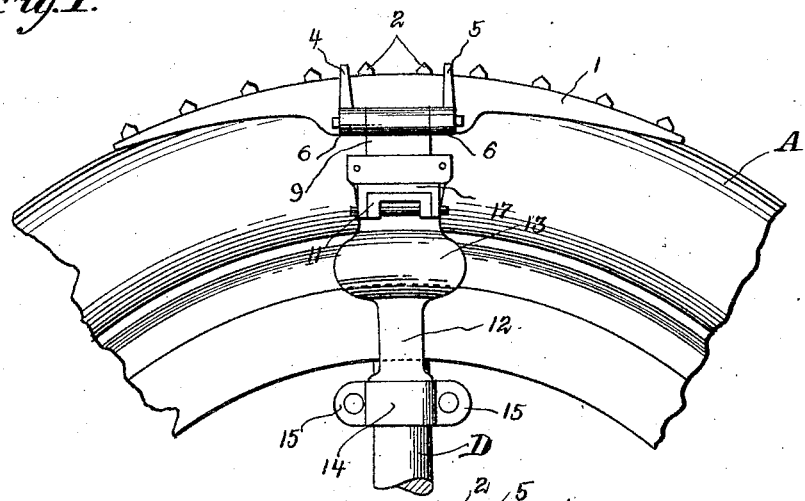
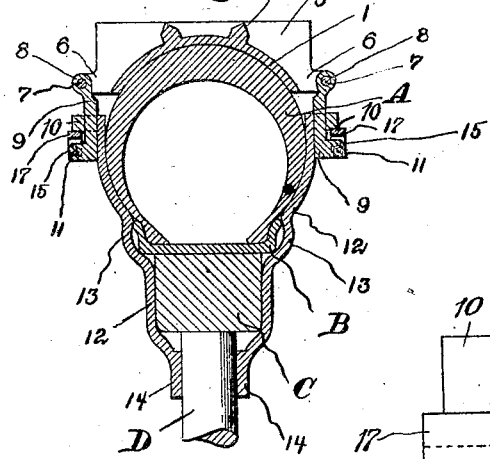
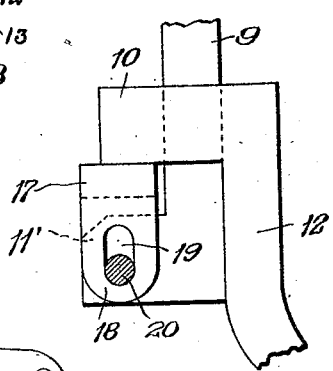
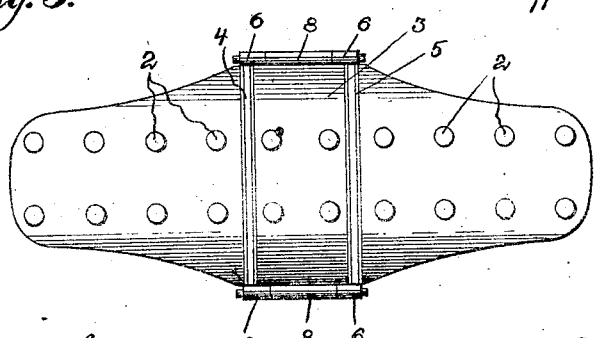
Joseph Soukup
INVENTOR
BY Victor J. Evans
ATTORNEY
WITNESS:
J. M. Evans Patented May 11, 1926.

1,584,676

UNITED STATES PATENT OFFICE.

JOSEPH SOUKUP, OF NORTH CHICAGO, ILLINOIS.

ANTISKID SHOE.

Application filed June 21, 1921. Serial No. 479,345.

This invention relates to antiskid shoes adapted for mounting about the tread portions of motor vehicle tires to assist in the traction of the wheels and also prevent skidding thereof.

An object of the invention is to provide an antiskid shoe as specified which can be quickly and easily mounted upon a tread portion of a vehicle tire eliminating the trouble and inconvenience contingent with the mounting of antiskid chains of various makes upon the tires as well as one which will prevent circumferential or lateral skidding of the wheel upon which it is mounted.

Another object of this invention is to provide a device as specified which comprises a main shoe of concave structure transversely and longitudinally so that it will properly fit the tread portion of a tire and which has a plurality of grousers or lugs upon its outer surface and further to provide means for connecting the main shoe to the spokes of the vehicle wheel upon which it is mounted, which structure will permit limited radial movement of the shoe relative to the axis of the wheel and also to provide a device for locking the tire shoe against such relative movement.

Other objects of the invention will appear in the following detailed description and in the accompanying drawing wherein:

Fig. 1 is a side elevation of the improved antiskid shoe showing it applied.

Fig. 2 is a cross section through the improved shoe showing it mounted on a tire.

Fig. 3 is a plan view of the shoe.

Fig. 4 is a fragmentary detail view illustrating the position of the tire shoe locking elements, embodied in the invention, when in locking position.

Referring more particularly to the drawing the improved antiskid shoe comprises a main shoe or body 1 which is concaved longitudinally and transversely to snugly fit the tread portion of a tire as shown at A and which is provided with a plurality of longitudinally spaced lugs 2 projecting outwardly from its outer surface and arranged in any desired position upon the shoe body 1. The shoe body 1 may have its sides, outwardly of its intermediate portion 3, concavely curved if desired as shown in Fig. 3 of the drawing, however the shape of the shoe body in plan may be varied from that shown in the drawing if it is so desired.

A pair of spaced ribs 4 and 5 extend transversely of the shoe body 1 intermediate its ends and in spaced relation to each other having their outer edges projecting beyond the outermost portion of the outer surface of the shoe body 1 while their ends provide projecting corners as shown in Fig. 2 of the drawing to provide an increased surface adapted to bite into the road surface over which the vehicle is traveling to assist the tractive proclivities of the wheel.

The transverse ribs 4 and 5 have eyes or lugs 6 formed at their innermost corners which receive therethrough pivot pins 7. The pivot pins 7 extend through the barrels 8 of the coupling members 9. The coupling members 9 project downwardly through suitable guide straps 10 and have their lower ends angled as shown at 11. The guide straps 10 are carried by the outer ends of the clamping members 12 which are shaped as shown at 13 to fit about the wheel rim B of the wheel C upon which the tire A is mounted, for supporting the antiskid shoe. The inner ends of the clamping members 12 are shaped to snugly fit about the spokes D of the wheel C as shown at 14, and they have tangential ears 15 through which suitable clamping bolts may extend for securely clamping the members 12 to a spoke D. The connecting members 9 extend slidably behind the straps 10 to permit limited movement of the shoe body 1 relative to the clamping members 12 and consequently relative to the wheel C.

Substantially U-shaped members 17 are pivotally supported by the lower angle ends 11 of the couplings 9 and are adapted to be swung upwardly to position their bight portions upon the angled ends 11 of the couplings 9 to securely clamp the shoe body 1 onto the tire A as illustrated in Figs. 1 and 2. As best illustrated in Fig. 2 the members 17 are held in position by reason of being clamped between the straps and the angled ends 11 when the device as a whole is in position on the tire tread with the shoe body out of contact with the ground over which the tread is travelling. It will be noted that members 17 are provided with outstanding ears 18 having slots 19 formed therein adapted to receive pins 20 threaded into the angled ends 11 so that the bight portions of the members 17 may be quickly and readily swung into the position above described.

In positioning the device in operative position the U-shaped members 17 are swung outwardly out of operative position and the shoe body 1 is placed in position on the tire tread with the clamping members 12 in position to be bolted together with their portions 14 in clamping engagement with the spoke D of the wheel C. Before bolting the clamping members in position they are manually forced toward the center of the wheel bringing the straps 10 into engagement with the angled ends 11, drawing the shoe body against the tread to effect a tight and snug fit of the shoe body on the tire tread and after this is accomplished the clamping members are ready to be securely bolted in clamping position with the spoke. The next step in completing the mounting of the device in operative position is to swing the U-shaped members 17 into operative position, as illustrated in Fig. 2, and this is accomplished by manually pressing down upon the shoe body to depress the tire at this point so as to move the coupling members 9 in a direction to open a space between the straps 10 and angular ends 11 sufficiently large enough to receive and accommodate the bight portions of the U-shaped members when swung back into operative position. After swinging these U-shaped members into their operative positions, pressure is released on the shoe body and the U-shaped members are clamped between the straps 10 and the angular ends 11 by reason of the return of the tire to its normal position. It is apparent that the U-shaped members assist in assuring a snug and tight fit of the shoe body relative to the tire tread as by the provision of these U-shaped members a second adjustment can be made to the device after first adjusting the device to clamp the clamping members in operative position upon the spoke.

It is of course, to be understood that the invention may be constructed in various other manners and the parts associated in different relations and, therefore, I do not desire to be limited in any manner except as set forth in the claims hereunto appended.

Having thus described my invention what I claim is:

1. In an antiskid shoe, the combination of a shoe body concavely curved longitudinally and transversely for fitting a tire, spoke clamping members connected to said shoe body for limited movement relative thereto, means for clamping said clamping members to a spoke, and means for preventing relative movement of said clamping members and shoe body.

2. In an antiskid shoe the combination of a shoe body, shaped to fit the tread portion of a tire, coupling members pivotally carried thereby, clamping members slidably connected with said coupling members and adapted to be clamped on a wheel spoke, said coupling members and shoe body adapted for limited movement relative to said clamping members.

3. In an antiskid shoe the combination of a shoe body, shaped to fit the tread portion of a tire, coupling members pivotally carried thereby, clamping members slidably connected with said coupling members and adapted to be clamped on a wheel spoke, said coupling members and shoe body adapted for limited movement relative to said clamping members, and locking members pivotally carried by said coupling members for preventing movement of the shoe body and coupling members relative to said clamping members.

In testimony whereof I affix my signature.

JOSEPH SOUKUP